```
┌─────────────────────────────────────┐
│ Melt spin into a hollow fiber shape │
│ an intimate mixture of a thermoplastic│
│ polymer and plasticizer therefor    │
│ at a temperature less than the boil-│
│ ing point of the plasticizer        │
└─────────────────────────────────────┘
                  │
                  ▼
        ┌──────────────────────┐
        │ Cool to a shaped     │
        │ hollow fiber element.│
        └──────────────────────┘
                  │
                  ▼
        ┌──────────────────────┐
        │ Fabricate into hollow│
        │ fiber separatory cell│
        └──────────────────────┘
                  │
                  ▼
┌─────────────────────────────────────┐
│ Leach with a solvent that is a      │
│ solvent for the plasticizer and     │
│ a non-solvent for the polymer       │
└─────────────────────────────────────┘
```

*Fig. 2*

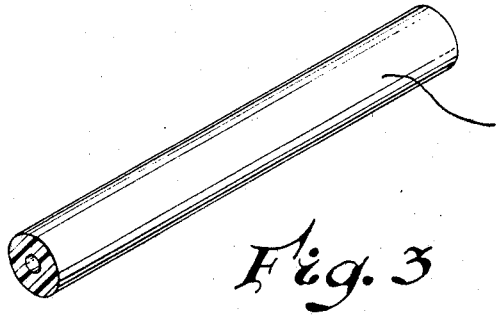

Melt spun hollow fiber comprised of a thermoplastic polymer and a plasticizer therefor that is soluble in a non-solvent for the polymer

*Fig. 3*

INVENTORS.
Earl A. McLain
Henry I. Mahon

BY　*Jerome Rudy*

ATTORNEY

United States Patent Office 3,423,491
Patented Jan. 21, 1969

3,423,491
PERMSELECTIVE HOLLOW FIBERS AND
METHOD OF MAKING
Earl A. McLain and Henry I. Mahon, Walnut Creek,
Calif., assignors to The Dow Chemical Company, Midland, Mich., a corporation of Delaware
Filed Sept. 2, 1964, Ser. No. 393,903
U.S. Cl. 264—49          18 Claims
Int. Cl. B29d 23/06; D01f 7/00

ABSTRACT OF THE DISCLOSURE

This application is concerned with making hollow fiber permeability membranes by the method of extruding into the shape of a hollow fiber, a molten intimate mixture of a thermoplastic polymer and a plasticizer for that polymer wherein the plasticizer has a boiling point above the extrusion temperature and is further characterized in being soluble in a non-solvent for the polymer.

---

Figure 1:
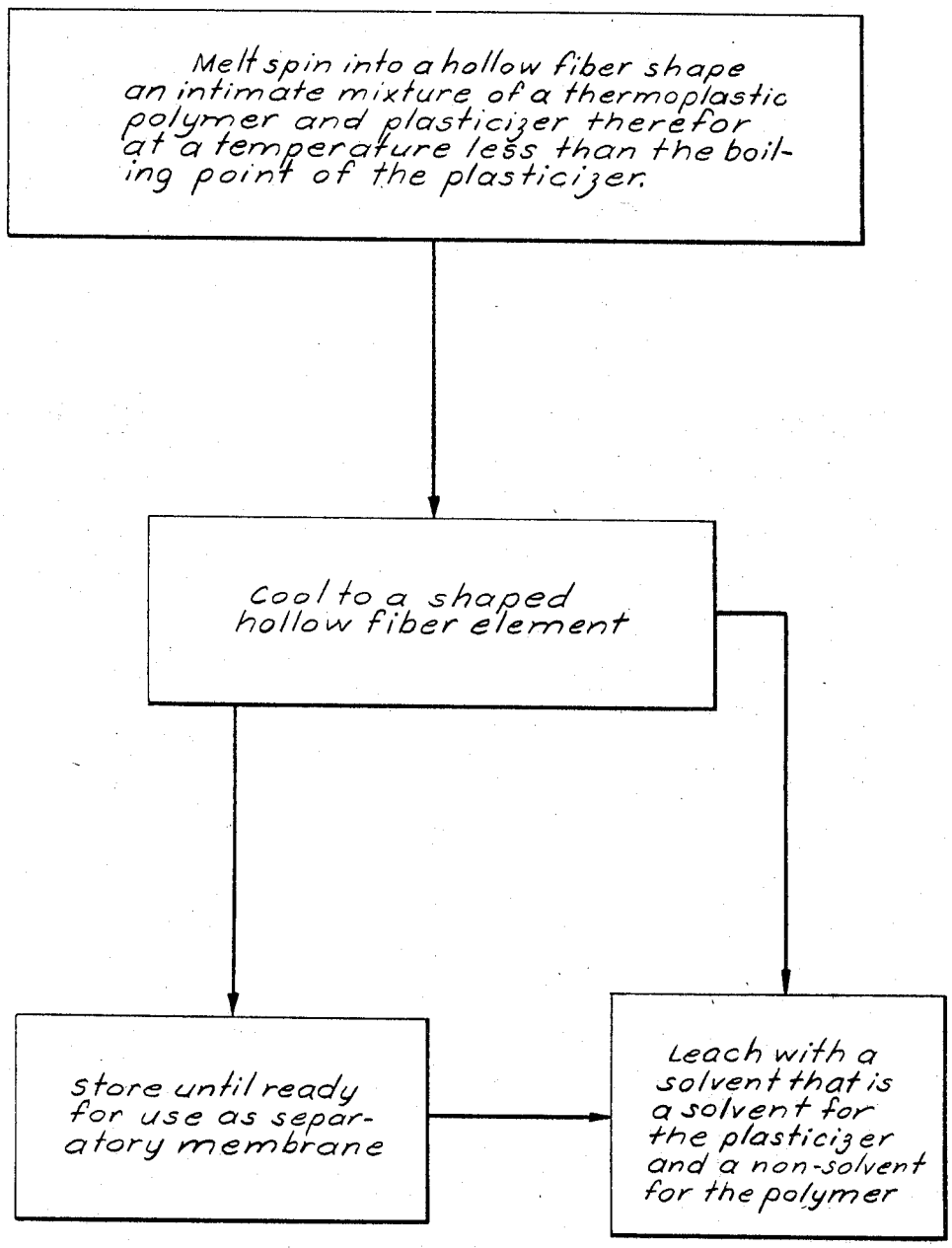

The present invention relates to melt spun hollow fibers of synthetic, thermoplastic polymeric materials that are excellently well suited for use as permeability membranes in separatory apparatus and processes.

A diversity of membranes are known which, to various degrees, have the property of being selectively permeable to different components of fluid mixtures. Thus, some membranes will pass water while restraining ions. Other membranes will selectively pass ions in solution. Still other membranes possess selective permeation rates for two or more non-ionic components of fluid mixtures. Additional types of membranes are the so-called molecular sieve type, such as those used for dialysis. These can oftentimes pass ions or other materials but tend to restrain passage of high molecular weight components or are adapted to pass only certain molecular weight fractions of given materials, depending on actual molecular size and propositions thereof.

Reverse osmosis, or ultrafiltration, is one of the most practical applications of permeability separation. For example, when a solution is passed on one side of an osmotic membrane and the corresponding solvent is placed on the other side of the membrane, the solvent will pass through the membrane into the solution. The force causing this transfer varies with the character and concentration of the solution involved. This force is known as the specific osmotic pressure for that solution.

When a pressure differential is applied to the solution (opposed to any pressure that may be exerted on the solvent side of the membrane and in excess of the specific osmotic pressure of the system) a "reverse osmosis" or ultrafiltration is effected. In such cases, solvent from the solution is forced through the membrane while the ions are restrained from passing therethrough. When a membrane material is used that is appropriate for selective permeability of such fluids, the reverse osmosis process functions at or above the prescribed pressure for almost all fluids.

The rate of flow of liquid through a membrane can be calculated by the equation:

Rate = $PC \times$ Area $\times$
(Pressure Differential — Osmotic Pressure) ÷
Membrane Thickness In the above equation, PC represents permeability coefficient which has a value depending on the material used in the membrane, as well as the components being separated. With reference to the above equation, it can be seen that, everything else remaining the same, the rate is directly proportional to the permeability coefficient (PC). The PC is not readily calculated from physical constants but can be determined empirically. It is apparent that for economical operation, particularly when consideration is taken of the large volume of saline water that would be treated on a feasible commercial scale, permeability coefficients as large as possible are desirable if not necessary.

However, providing a membrane having relatively greater water permeability coefficients is not ordinarily enough in itself to afford an effective or efficient water desalination process. The membrane must, in addition, have adequate salt rejection properties, that is, the ability of the membrane to permit water to pass therethrough while preventing the passage of saline constituents in the same direction. Otherwise, an excessive number of stages must be employed in order to obtain an acceptable purification or separation. The salt rejection of a membrane can be determined from the equation:

Salt rejection (percent) =

$$\frac{(\text{Salt concentration in feed}) - (\text{Salt concentration in permeate})}{\text{Salt concentration in feed}} \times 100$$

A permeable hollow fiber suitable for water-salt separations can be characterized by its water permeation coefficient and salt rejection. These properties are conveniently measured in single fiber tests. As used hereinafter in the specification and claims unless otherwise specified, permeability coefficient (PC) and salt rejection (SR) are meant to be permeability coefficients and salt rejections as measured and determined according to the following test and Formula I and Formula II respectively.

In this test, an individual hollow fiber is filled with distilled water and sealed at one end. The fiber is mounted open end up on a frame which is accurately ruled in metric length dimensions. The frame is partially immersed in a water bath and the meniscus on the water column in the core of the fiber falls to a level approximately the same as the water level in the surrounding bath. This initial length of the water column within the fiber is then precisely determined.

The frame is then transferred to and immersed to the same depth in a salt solution of the desired concentration. The water in the core permeates to the outside under the osmotic driving force. (The rate of water permeation decreases with time because the effective transfer area decreases.) The permeation coefficient is determined by microscopic observation of the initial rate of fall of the water column in the core. The permeation coefficient is calculated as:

$$PC = \frac{Qt}{A\Delta P} \quad (I)$$

where:

PC = Permeation coefficient, cm./sec.
Q = Quantity of water permeated in measured time, g./sec.
t = Fiber wall thickness, cm.
A = Average permeation transfer area effective in measured time, cm.$^2$
$\Delta$P = Osmotic driving force, g./cm.$^2$ If the fiber is impermeable to salt, all of the water in the core will permeate to the outside. Generally a minor amount of salt transfer occurs from the outside solution into the core. When salt transfer occurs, the water column in the core reaches some minimum length rather than permeating completely. A measure of the salt rejection of the fiber is obtained by relating this minimum water column length to the initial water column length according to Formula II:

$$SR = \frac{L_I - L_M}{L_I} \times 100 \quad \text{(II)}$$

where:

SR = Salt rejection, percent
$L_I$ = Initial water column length, cm.
$L_M$ = Minimum water column length, cm.

When permeable hollow fibers are assembled in a separatory cell and tested in a reverse osmosis system, the PC and SR can be calculated from the test data:

$$PC = \frac{Q't}{A'\Delta P'} \quad \text{(III)}$$

where:

$Q'$ = Water permeation rate, g./sec.
$A'$ = Total permeation transfer area, cm.$^2$
$\Delta P'$ = Permeation driving force (hydraulic pressure—osmotic pressure), g./cm.$^2$ and $$SR = \frac{C_F - C_P}{C_F} \times 100 \quad \text{(IV)}$$

where:

$C_F$ = Feed solution salt concentrations, g./cm.$^3$
$C_P$ = Permeate salt concentration, g./cm.$^3$ Permeation coefficients obtained in single fiber tests are the optimum values for a given type of fiber. Coefficients obtained in reverse osmosis tests are generally slightly lower, whereas salt rejection values are comparable for both measurements.

Substantial pressures are generally required to produce reverse osmosis. For most commercial aqueous ionic solutions, including saline solutions, at least 100 pounds per square inch is required. Since the rate of mass transfer is directly related to pressure differential, the efficient range of reverse osmosis usually requires pressures of many hundreds of pounds per square inch.

Despite the inherent advantages of separation systems using permeable membranes, there has been only a very limited adoption of such devices on a commercial scale, or, for that matter, to any great extent for any purpose whatever. This has been due mainly to the relatively inefficient rate of transfer of the desired components from one side of the membrane to the other.

Contributing greatly to the inefficiency of the generally known membrane systems is the particular design of the membrane system in which the separation is effected. Thus, commercial use of permeability membranes has been directed primarily to thin, uniplanar membranes which are rigidly supported in grooved, perforated or porous backing members in order to withstand the requisite operating pressures. Obviously, in such an arrangement, a membrane sheet of exceedingly large area or a plurality of such sheets are necessary in order to achieve any practical results. In such installations, "dead" areas are present that actually constitute portions which are unavailable for permeation purposes. These areas result in the spaces where the membranes are pressed against the backing plates in the apparatus. Consequently, the "free" area available for permeation is reduced in accordance with the total "dead" area required for supporting the membrane.

Recent developments employing extremely small hollow fibers as the permeable membranes as described in copending applications assigned to the assignee of the instant application Ser. No. 57,055, filed Sept. 19, 1960 now Patent No. 3,228,876; Ser. No. 117,647, filed June 16, 1961, now Patent No. 3,228,877; and Ser. No. 318,555, filed Oct. 24, 1964, have greatly enhanced the operating efficiency of such separatory systems. The operation of reverse osmosis for desalination, for example, of aqueous solutions with hollow fibers generally involves collecting relatively salt free water as permeate from one side of the hollow membrane, mounted in a suitable apparatus, while passing the saline or brackish water over the opposite side of the hollow fiber membrane under pressure such that water permeates the wall of the hollow fibers while preventing the flow in that direction of the saline constituents. When hollow fibers are utilized in place of flat membranes, permeation area is immensely increased while minimizing total operating space, and unusually high pressures can be utilized without deleteriously affecting the membrane wall.

Although the development of hollow fiber permeable membranes has provided outstanding improvements in the efficiency and overall utility of permeation separatory processes, the material employed in the hollow fiber membrane, and additionally, the means by which the hollow fiber membrane is made have significant and oftentimes controlling influence on the effectiveness of separation or purification of the material being treated. It is, of course, paramount that the hollow fibers be permeable in order to effect a separation. But this is not all. Not only must the fibers be permeable but they must have the capacity to pass certain constituents while restraining the passage therethrough of other constituents. For instance, hollow fibers of some polymeric materials may have low water permeability coefficients and salt rejection. Others may have relatively high water permeability coefficients but essentially no or totally unacceptably low salt rejection for desalination. It is apparent, as indicated, that not all polymeric materials are equal or even usable for all conceivable types of separation. For that matter, we have found that there are significant differences between hollow fiber membranes in regard to efficiency of separation when the same polymeric material is involved but different methods of manufacture are employed. Thus, most of the suitable thermoplastic polymers are susceptible to being spun into hollow fibers by wet, dry or melt spinning. It has been found, however, that wet spinning has several attendant disadvantages for the manufacture of permselective hollow fibers. Among these disadvantges is the relatively slow speed at which wet spinning permits the manufacture of such structures. Also, there is a general tendency for dry or even wet spun hollow fibers to have rough and irregular surfaces inclined towards pin-holes which obviously reduce the efficiency of the separation and the life of the membrane. Additionally, it is usually required that wet spun hollow fibers must be dried before they can be efficiently and effectively potted or sealed in a separatory cell, and as a result of the drying, it is generally observed that the permeation properties are undesirably or unacceptably low. Melt spinning of the hollow fibers is preferred but these frequently do not possess properties required of a separatory membrane, and in any event, before the selective separation effectiveness of a hollow fiber membrane can be determined for whatever separation is intended, it must first be provided in a permeable condition.

Accordingly, it is among the chief objects and primary concerns of this invention to provide an efficient means for preparing hollow fibers of a synthetic, thermoplastic polymeric material that are selectively permeable and capable of providing excellent transfer rates and effecting excellent separations and purifications in separatory processes.

It is a further object of the invention to provide a means for preparing a separatory cell or apparatus of hollow fibers of a synthetic, thermoplastic polymeric material having excellent utility and long life efficiency in separatory processes.

It is a yet further object to provide plasticized, synthetic thermoplastic hollow fibers capable of being readily transformed into selective hollow fiber permeability membranes having excellent permeation and separation properties.

It is a still further object to provide hollow fiber permeability membranes having an excellent combination of a high water permeability coefficient and salt rejection value and which are eminently well suited for water desalination processes.

These and additional objects and advantages are accomplished in and by practice of the present invention wherein permselective hollow fiber membranes are melt extruded from a molten intimate mixture of a thermoplastic polymer and a plasticizer for the polymer, the plasticizer characterized in having a boiling point above the temperature at which the molten mixture is melt extruded and further characterized in being soluble in a non-solvent for the polymer. The resulting solid, plasticized hollow fiber can then be leached with the solvent that is a solvent for the plasticizer but a non-solvent for the polymer and, preferably, kept wet prior to being employed as a separatory membrane or element in a separatory cell or apparatus. Or, the solid plasticized hollow fiber may be stored for a length of time prior to being leached after which it is kept wet or put in use immediately as a separatory membrane. Another and desirable alternative is to fabricate the solid plasticized hollow fiber in a separatory cell by securing or potting the ends thereof or whatever other fabrication techniques may be employed, and thereafter leaching the plasticizer with a suitable solvent that is a non-solvent for the polymeric constituent of the hollow fiber.

The invention will be more fully delineated in the ensuing description and specification and the attached drawing wherein:

FIGURE 1 schematically illustrates a means for preparing hollow fiber membranes in accordance with the present invention;

FIGURE 2 schematically illustrates a means for preparing a separatory cell or apparatus employing hollow fiber membranes in accordance with the present invention; and, FIGURE 3 perspectively illustrates a hollow fiber containing a plasticizer that is leachable therefrom and capable of being transformed into a permeable hollow fiber membrane.

The permeability separatory hollow fiber membranes prepared by the present invention can be used for the recovery or separation of components from various types of fluid mixtures or solutions. The following are typical examples of various commercial recoveries or separations which can be effected with the use of hollow fibers provided by this invention:

(1) Recovery of water from sea water or brackish water.

(2) Concentration of salts and other chemicals in the various solutions such as NaCl, KCl, KBr, $Na_2CO_3$, $Na_2SO_4$, $Na_2B_4O_7$, $Na_3PO_4$, NaBr, NaF, $CaCl_2$, NaOH, KOH, ammonium and nitrate fertilizers, uranium and other rare salts from leach liquors, $H_3PO_4$, $CuSO_4$, monosodium glutamate, sodium thiosulfate, sodium chromate, sodium chlorate, lithium carbonate, alum, aluminum sulfate, ammonium chloride, ammonium nitrate, heavy water, glycerine, lactic acid, tanning extracts, alcohol, hydrogen fluoride, glycols, etc.

(3) Ion exchange processes, including water softening, anionic soften, recovery of magnesium from sea water, etc.

(4) Separation or concentration of heat sensitive materials, such as in the concentration of natural fruit and vegetable juices, e.g., orange, grapefruit, grape, etc., concentration of sugar solutions, concentration of beverages such as milk and extracts of coffee, tea, etc., and for various medical and pharmaceutical purposes such as in artificial kidneys, treatment of sterile solutions, isolation of virus or bacteria, fractionation of blood, production of serum, the concentration of alkaloids, glucosides, hormones, vitamins, vaccines, amino acids, antisera, antiseptics, proteins, organometallic compounds, antibiotics, etc.

(5) Separation of components which normally azeotrope or boil very closely to one another, separation of ammonia from organic amines, etc.

(6) Processing of industrial waste streams such as waste form radioactive materials, sulfite pulps, fissionable waste, cannery waste, recovery of caustic from viscose solutions, recovery of acids form metal treating processes, etc.

Another field for which the hollow fiber membranes provided by this invention are particularly adapted and is in the separation of components from a gas mixture. For example, hydrogen permeates polystyrene permeable fiber about 22 times as fast as nitrogen and therefore it can easily and very practically be separated from mixtures containing the two gases, for instance, from mixtures such as those produced by the disassociation of ammonia wherein the resultant gas contains about 75 percent hydrogen and 25 percent nitrogen.

Likewise, the separation of hydrogen from mixtures containing carbon dioxide can be effected very practically utilizing the hollow fibers preparated by this invention by using polystyrene permeable hollow fibers. Therefore, various commercially available mixtures of this type can be used, such as those produced in the dehydrogenation of ethyl benzene for the production of styrene, in which case hydrogen can be removed by the hollow fibers derived from this invention and the resultant carbon dioxide-rich residue gas is recycled to the dehydrogenation process. Hydrogen can be similarly separated from other hydrogen-containing gases such as coke oven gas, gases from hydrogenation processes and from petroleum refinery operations.

Also feasible are the gas phase separation of chlorinated methanes from unreacted methane, and the separation of nitrogen from methane to make natural gas more saleable. A somewhat related separation is the recovery of oxygen from sea water, in the manner of an artificial gill, whereby sea water passed either inside or outside the hollow fiber effects a permeability separation of the oxygen which permeates the fiber wall. The hollow fibers provided by this invention can also be utilized in the separation of oxygen from air, or helium from natural gas, etc.

Any of the known thermoplastic polymers that can be suitably melt extruded from a plasticized composition into a hollow fiber shape can be utilized in the present invention. The selection of any particular polymer will depend in large measure upon the use for which is intended, i.e., upon the components and separation thereof that is to be effected. The hollow fiber membrane, as mentioned, will necessarily have to possess adequate permeability and restraining properties for the system involved. Additionally, it would be a rather futile effort to employ a polymeric composition that would be dissolved or readily deteriorated by the material that is to be separated. Exemplary of the thermoplastic polymers that can be employed in the practice of the present invention include the cellulose esters such as cellulose mono-, di- and triacetates, cellulose propionate, cellulose butyrate, cellulose acetate propionate, cellulose acetate butyrate; celluose ethers such as ethyl cellulose; superpolyamide (or more simply, polyamide) polymers which have become generically characterized as "nylons" such as Nylon 6, Nylon 6–6, Nylon 6–10, Nylon 11, etc.; polycarbonates; polyvinyl chloride and vinyl chloride polymers; vinylidene chloride polymers; acrylic ester polymers; organic silicone polymers; polyurethanes; polyvinyl formals and butyrals and mixtures thereof; methacrylate polymers; styrene polymers; polyolefins such as polyethylene, polypropylene and the like (including such species as chlorinated and sulfonated polyethylene, polypropylene, etc.); polyesters such as polyethylene glycol terephthalate; acrylonitrile polymers; etc.

The plasticizer that is employed will be dictated for the most part by the polymer since, obviously, a plasticizer for one polymer may have little or no effect in this regard on other polymers. We have found further, as will be pointed out more specifically later herein, that all plasticizers for a given polymer are not necessarily of equal effect in providing a fully acceptable hollow fiber separatory membrane, at least not for a given separation. The artisan will be able, however, following the present teachings, to choose the most efficient or useful plasticizer and polymer for any particular separation to be undertaken.

Among the many demands imposed on the plasticizer employed to manufacture commercially acceptable hollow fibers in accordance with the invention are: (a) It must be capable of attaining a low enough melt viscosity of the polymer composition to permit extruding of a smooth hollow fiber from the spinneret orifice at a low enough temperature so that deleterious polymer degradation does not occur; (b) The plasticizer must have a sufficiently low vapor pressure such that significant loss thereof does not occur during the spinning operation; (c) The spun plasticized hollow fiber must have sufficient tensile strength and rigidity to permit taking-up the fiber without deformation on the take-up capstans or drums; (d) The plasticizer in the spun hollow fiber must be readily and essentially completely removable, and both before and after removal of the plasticizer the hollow fiber must have sufficient tensile strength and rigidity to permit construction of useful permeability separatory elements and apparatus; and, (e) The hollow fiber after removal of the plasticizer must have sufficient permeability properties, e.g., high permeability coefficients and salt rejection, to be of commercial utility for the construction of permeability separatory elements and apparatus. It is most beneficial and desirable that the chosen plasticizer have a boiling point above the chosen or necessary temperature for the hollow fiber extrusion.

The amount of the plasticizer that is admixed with the thermoplastic polymer will vary depending on a number of factors including (1) the effectiveness of the plasticizer for the polymer, (2) the amount of plasticizer needed to provide a low enough temperature for extrusion, (3) the subsequent handling and processing to which the plasticized hollow fiber will be subjected and of principal concern here is the strength of the hollow fiber, and (4) the permeability properties desired in the hollow fiber membrane. Depending on these factors the weight ratio of plasticizer to polymer may vary from as little as 0.1 to 1 up to 3–4 or more to 1. Generally, for thermally sensitive polymers that cannot be brought to a low enough viscosity for spinning without thermal degradation, a weight ratio of plasticizer to polymer of from about 0.25:1 and 1.2:1 and preferably between about 0.5:1 and 1:1 is employed. In the case of more thermally stable fibers, weight ratios of from about 0.1:1 to 1:1 and preferably between about 0.25:1 and 0.5:1 are employed.

As indicated, the plasticizer is leached from the extruded hollow fiber with a suitable solvent for the plasticizer, which solvent is a non-solvent for the polymer. By and large these plasticizer solvents or extractants fall into the class of water and alcohols. When the hollow fiber membranes are to be employed in the treatment of aqueous solutions it is frequently found advantageous to employ water as the leaching medium when it is effective for the purpose. Some examples of systems of polymer-plasticizer and plasticizer solvent or extractant that can be employed in the present invention are set forth in the following table.

| Polymer | Plasticizer | Extractant |
|---|---|---|
| Polyvinyl chloride. | Di(2-ethylhexyl)phthalate, butyl Cellosolve stearate, tetra hydrofurfural oleate, di(methyl Cellosolve)phthalate, di-n-hexylphthalate, di(2-ethylhexyl)-adipate, di(2-ethylhexyl) sebacate, tricresyl phosphate. | Alcohols, aromatics. |
| Polystyrene. | Dimethyl phthalate, dibutyl sebacate, hexadecyl chloride, Decalin. | Alcohols. |
| Polyethylene terephthalate. | Cresols, O-hydroxybenzaldehyde, 2-methoxy benzaldehyde, 1-naphthaldehyde, m-chloroaniline, m-methylaniline, 1-naphthylamine, diphenylamine, 2-aminopyridine polyalkylene oxides. | Alcohols, aromatics. |
| Polyethylene terephthalate, polyethylene isophthalate copolymers. | Methyl phthalylethyl glycolate bis(tetrahydrofurfuryl)esters of succinic, adipic or sebacic acids, tolyl diphenyl phosphate bis(methoxyethyl)phthalate. | Do. |
| Polyolefins. | Dioctyl phthalate, polyethylene wax, tetrahydronaphthalene, chlorinated biphenyls. | Do. |
| Ethyl cellulose. | Polyethylene glycols, polypropylene glycols, dibutyl phthalate, di(2-ethyl hexyl)adipate. | Water, alcohols. |
| Nitrocellulose. | Polyethylene glycols, diethylene glycol monolaurate, n-butyl stearate, methyl acetylricinoleate, methyl Cellosolve acetyl ricinoleate, di-n-butyl phthalate. | Water, alcohols, paraffins. |
| Polyacrylonitrile | Bis(2-cyanoethyl)nitroamine, N,N-dimethyl methoxyacetamide, sulfolane, malononitrile, m- and p-nitrophenol, dimethyl sulfone, ethylmethyl sulfone, dimethyl sulfoxide, tetramethylene sulfoxide, dimethyl formamide, caprolactam. | Water, alcohols. |
| Acrylonitrile-vinyl acetate copolymers. | Dipropyl nitrosoamine, nitrosomorpholine, sulfolane. | Do. |
| Acrylonitrile-vinyl chloride copolymers. | Sulfolane. | Water. |
| Vinylidene chloride-vinyl chloride copolymers. | Sulfolane, phenoxypropylene oxide, alpha, alpha-dimethyl-dibenzyl ether sebacates, tributyl aconitate. | Water, alcohols. |
| Polyamides. | Phenol, o-, m-, p-cresol, resorcinol, 2-phenylethanol, salicylic acid, caprolactam, p-tert-butylphenol, N-ethyl-o- and p-toluene sulfonamide. | Water, alcohols, dimethylformamide, pyridine. |
| Cellulose esters. | Dimethyl sulfoxide, 2-pyrolidone, gamma-butyrolactone, malononitrile, dibutyltartrate, dimethylphthalate, diethylphthalate, triacetin, triphenylphosphate, tributylphosphate, cyclic acetal, di-(methoxyethyl) phthalate, tetramethylene sulfone (sulfolane), 2,4-dimethylsulfolane, 3-solfolanyl acetate, 3-sulfolanyl propionate, 3-sulfolanyl butyrate, 3-methyl sulfolanyl ether, 3-ethyl sulfolanyl ether, 3-n-propyl sulfolanyl ether, 3-ethyl thiosulfolanyl ether, tetramethylene sulfoxide, caprolactam, gamma-valerolactone. | Do. |

The polymer and plasticizer are mixed preferably prior to the creation of the melt from which the hollow fiber is extruded. Mixing can be accomplished in any convenient manner, the important feature is to attain an intimate uniform mixture. One desirable means is to disperse the polymer in an inert solvent and then dissolve therein the plasticizer causing the formation of a gel which is separated, dried, and comminuted. A powder of excellent uniformity of composition can be obtained by this method.

The melt spun hollow fiber membranes are advantageously rapidly cooled to solid shaped hollow fibers upon emerging from an adequately designed (generally annular shaped) spinnerette of a known variety. This can be accomplished by passing the spun fibers through air or some other inert gaseous medium. An aqueous or other inert cool liquid medium can be employed but is generally to be avoided since spinning rates are often times unacceptably slower and premature leaching is apt to take place which may pose problems of storing and handling the hollow fiber membranes.

Extrusion temperatures should be as low as practicable to avoid polymer degradation while taking into consideration the ease of spinning. For instance, when spinning a cellulose triacetate composition, temperatures much above about 285° C. should be avoided if possible. Advantageously and preferably, when cellulose triacetate is involved, extrusion temperatures between about 200–285° C. are employed. At temperatures below about 200°, the amount of plasticizer required for adequate fluidity is excessive, so that subsequent leaching does not leave an adequate polymer structure.

The extruded or spun hollow fibers after having been cooled can be passed directly through a leaching bath to remove the plasticizer, or, the hollow fibers can be taken up on a spool or roll and stored for any desirable length of time before leaching or removing the plasticizer. The leaching treatment can be carried out by any convenient means such as by passing the fibers through a bath of the selected solvent, or by semi-batch immersion of a spool or bundle of the fibers. The plasticizer-containing fibers can be on the other hand, stored until it is desirable or convenient that they be fabricated into a suitable separatory apparatus and leached at that time, or the plasticizer-containing fibers can actually be fixed in the separatory cell or apparatus, e.g. by potting the ends, and the plasticizer leached therefrom when the cell is ready for operation. For that matter, in order to avoid degradation of the permselective properties of the fiber, it is desirable to maintain the fiber in a wet or immersed state once the plasticizer is leached therefrom. The ability to store the plasticizer-containing hollow fibers over an extended period of time before removal of the plasticizer is very beneficial particularly under circumstances such that a leached hollow fiber would tend to dry out and lose its effectiveness.

The required leaching time may vary depending on the effectiveness of the extractant solvent on the plasticizer, the amount of plasticizer in the hollow fiber, the size of the hollow fiber and the like. Ordinarily, sufficient leaching to obtain a permeable membrane is attained in a matter of a few minutes although extended periods of time can be used if desired or convenient.

The ability to fabricate the plasticized fibers directly into a separator cell is very beneficial. As indicated, it is frequently observed that once the hollow fiber membrane is leached essentially free of the plasticizer it may lose its overall effectiveness as a separatory membrane unless maintained in a wet condition or else sealed up tightly in a suitable container. This additional handling and treating is not only time consuming but detracts from the economics of the system, particularly if the place of use of the hollow fibers is not common with their place of manufacture. By first fabricating or potting the fibers in the desired separator cell before leaching, fresh membranes are always assured of maximum efficiency.

For the potting or sealing of the hollow fibers of the present invention in the preparation of separatory cells such as those described in the above-mentioned copending applications, epoxy resins are found particularly suitable. However, any casting resin which does not adversely affect the fibers and which gives the desired adhesion and strength characteristics can be used for this purpose. Typical examples of other suitable resins are: phenolaldehyde resins, melamine-aldehyde resins, thermosetting artificial rubbers, acrylic resins, etc. In addition to having the resin and the solvent in which the resin is applied inert to the fiber material, it is necessary that the resin solution have sufficient fluidity to penetrate between the fibers so as to fill the space completely, have proper adhesion thereto and provide a fluid-tight seal at the particular pressures and temperatures to which the ultimate product is to be submitted.

Epoxy resins are particularly suited for this purpose because of their inertness to solvents and to chemical corrosion, their setting characteristics and their ability to effect fluid-tight seals under the conditions to which the permeability cell is to be exposed.

Particularly suitable epoxy resins are those derived from the diglycidyl ether of bisphenol together with appropriate modifiers and curing agents. However, other epoxy resins can also be used such as the diglycidyl ethers of resorcinol, dihydroxy diphenyl, hydroquinone, etc. These can be modified by the addition of modifying resins, preferably amine resins, and appropriate curing agents and solvents. Certain materials can be used to serve both as a solvent for the resin and also to participate in the curing reaction such as liquid amines.

Additional treatments can be given the hollow fiber membranes either before being installed or after being installed in the separatory cell or apparatus. Thus, the fibers can be treated with selected reagents to change, modify or improve the separatory properties and efficiency of the membranes as, for example, when different compositions are to be treated, purified, concentrated or the like at different times. For instance, hollow fibers of cellulose triacetate can be deacetylated (deacylated) by treating them with a sodium hydroxide solution in methanol.

The hollow fibers of and prepared by the present invention are generally extremely fine. The wall thickness is desirably sufficient to withstand the pressure that will ordinarily be encountered in operating a separatory apparatus and process. Generally, a capability of withstanding pressures of 100 pounds per square inch or more is desired. It is found that the small diameter of these fine hollow fibers permit the self-supporting membrane walls of the fiber to withstand considerable pressures. FIGURE 3, as indicated, perspectively depicts, greatly enlarged, the general shape and configuration of the leachable plasticizer-containing cellulose triacetate hollow fibers of the invention.

It is generally preferred that the outside diameter of the hollow fibers does not exceed about 350 and advantageously no more than about 300 microns. Preferably the outside diameters are in the range of about 10 to 50 microns. A wall thickness to outside diameter ratio of from about ⅛ to ⅓ is advantageously employed in the hollow fibers. Ratios less than about ⅛ may result in an inability to withstand the desired pressures, whereas ratios greater than about ⅓ increase the resistance to permeation through the fiber wall. Profitably, the wall thickness of the fibers is in the range of about 1 micron to about 80 microns, praferably from about 2 to about 15 microns.

As a particular aspect of the present invention, as indicated is the providing of hollow fiber membranes having high water permeability combined with high salt rejection values, which fibers have particular utility in water desalination processes. We have found that cellulose esters, cellulose ethers and polyamides to be especially advantageous in this regard, and particularly the cellulose esters, notably and of significant benefit is cellulose triacetate. In order to be of commercial importance or practical utility, a hollow fiber membrane should have a water permeability coefficient (PC) of at least about $5 \times 10^{-14}$ cm./sec. and a salt rejection upwards from at least about 75%. Additionally, these values for the fibers should remain above those indicated levels for an extended period of time and not be subject to rapid decreasements. Fabrication of cells of the hollow fibers is a precise and detailed practice in order to assure efficient operation, and the necessity to replace the hollow fibers at frequent intervals is to be avoided as it can be a costly and time-consuming venture.

The use of hollow fibers of cellulose triacetate for separatory membranes in water desalination processes provides extremely beneficial results. However, not all cellulose triacetate fibers are equally well suited (the cellulose triacetate fibers that are not particularly beneficial for desalination can, of course, be used as separatory membranes in other systems that have been mentioned). The principal contributing factor enabling the production of cellulose triacetate hollow fibers having excellent water permeability coefficients and salt rejection in accordance with this invention, we have found to be the particular plasticizer employed. Thus, the use of sulfolane (tetramethylene sulfone) and ring-substituted derivatives thereof such as the 3-ol esters and ethers discussed in U.S. 2,219,006 and U.S. 2,451,299 are beneficially employed to this end. Especially outstanding and preferred as plasticizers for cellulose triacetate are the sulfolanes represented by the structural formula:

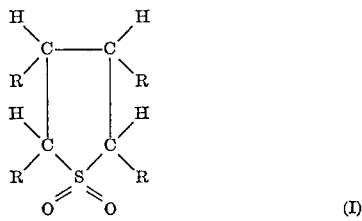

wherein R represents hydrogen or a methyl radical. Advantageously and preferably, sulfolane is employed, i.e., with reference to Formula I, when each R is hydrogen.

The amount of sulfolane and its ring substituted derivatives as discussed above that is employed with the cellulose triacetate has an important influence on the PC and salt rejection of the hollow fiber membranes prepared in accordance with the invention. The sulfolane-to-cellulose triacetate ratio has a pronounced influence upon the water permeability and salt rejection and additionally upon the useable life of the hollow fiber as an effective separatory element in a desalination process. It is generally observed that when sulfolane:cellulose triacetate weight ratios greater than about 1.25:1 are utilized in the melt spinnable composition the resulting hollow fibers (after removal of the sulfolane) have high water permeability but low salt rejection. Also when ratios greater than about 1.25:1 are employed the salt rejection (if the fibers have any initially) of the hollow fibers frequently begins to drop almost immediately after being put in use and a gradual drop continues for some time. Advantageously and beneficially, sulfolane-to-cellulose triacetate ratios of from about 0.25:1 to 1.25:1 and preferably ratios of from about 0.25:1 to 0.75:1 are employed (25 to 125 weight percent and 25 to 75 weight percent, respectively, based on cellulose triacetate weight). These ratios afford hollow fibers having an excellent combination of water permeability and salt rejection with little or no change in either water permeability or salt rejection over a considerable period of use time. Ordinarily, ratios below about 0.25:1 are not sufficiently plasticized for efficient and uniform spinning and processing.

As with the other hollow fiber membranes discussed herein, an aqueous solution is preferred for leaching of the sulfolane (and its indicated ring substituted varieties), and most advantageously water alone. Other solutions, aqueous and non-aqueous, containing materials capable of leaching or replacing the plasticizer in the fiber can be used before water leaching. Such procedures are generally less economical unless the material to be separated by permeation means is associated with a nonaqueous medium.

The following examples will further illustrate the invention, wherein, unless other specified, all parts and percentages are by weight.

EXAMPLE 1

A uniformly blended mixture of cellulose triacetate (43.2% acetyl content) and sulfolane (tetramethylene sulfone) is formulated according to the following procedure: The cellulose triacetate is ground to fine powder in a ball mill. A mixture of 300 ml. of benzene-pentane containing 20 volume percent pentane is prepared. 40 grams of the ground cellulose triacetate is added to the benzene-pentane mixture while stirring with a propeller-type agitator and the resulting mixture is then cooled to about 0° C. While stirring, 40 grams of sulfolane is added to the cooled mixture. The cooled mixture is heated while stirring to 50° C.–60° C. until a gel is obtained. 500 ml. of pentane is placed in a blender and, while agitating, the polymer gel is poured in which forms a precipitate which is separated by filtering through a coarse glass frit. The precipitate is twice more repulped in 500 ml. pentane and filtered. The final precipitate is dried in a vacuum oven for 16 hours at about 60° C. The dried powder resulting from the above procedure is found to be a uniform mixture free from gels. The proportions of constituents are determined by analyzing for sulfur content and the sulfolane content is thus computed. The weight ratio of sulfolane to cellulose triacetate is approximately 0.77:1.

The finely divided cellulose triacetate-sulfolane mixture, to remove entrained air, is compacted under vacuum and a pressure of about 20,000 p.s.i. A portion of the essentially air free mixture is then spun into hollow fibers according to the following procedure. The mixture is placed in a stainless steel sample tube having an internal diameter of ½ inch. The tube is approximately 9" long and the external diameter tapers from ¾ inch at the base to about ⅝" at the top. The bottom of the tube is plugged except for a ⅛ inch diameter opening through which the molten mixture is able to flow. The sample tube is inserted into a 4 inch diameter melt block which is electrically heated and is controlled at a temperature of about 203° C. The sample tube is forced into the bore of the melt block (which is tapered to match the tube) by a spinneret holder which is also electrically heated and controlled at about 235° C. The spinneret holder contains a ⅛ inch diameter passage which conducts the molten mixture to the spinneret. In order to assure that the mixture attains a uniform melt temperature it is allowed to remain in the melt block for about 15 minutes. The mixture, in a uniform molten condition, is forced through an annular orifice in the spinnerette formed between the outer walls of the orifice and a fine center core tube by the action of a hydraulically actuated piston moving down into the sample tube at a controlled rate. The internal diameter of the extruded hollow fiber is maintained by applying nitrogen under controlled pressure in the center core tube.

After the hollow fiber is passed through air at room temperature a sufficient distance to solidify it, the hollow fiber is taken up on a 10-inch diameter plastic drum driven at a rate of peripheral speed greater than the rate of extrusion such that the external diameter of the final hollow fiber is less than that of the extruded fiber. Excellent smooth-surfaced hollow fibers in the size range of about 30 to 200 microns outside diameter are prepared in accordance wtih the foregoing procedure.

A bundle of 50 hollow fibers, prepared according to the foregoing, about 30 cm. long and each having an outside diameter of about 190 microns and an inside diameter of about 108 microns is leached in water at room temperature to remove the sulfolane and then dried. The leached and dried bundle of fibers is mounted in a glass U-tube, equipped with an outlet valve at the bottom of the U, by sealing the space between and around the fibers at both ends of the U with an epoxy resin. The ends of the hollow fibers extend slightly beyond the seal and are kept open.

Water under a pressure of about 188 p.s.i.g. is admitted to the interior, i.e., the hollow cores, of the fibers through a fitting attached to one end of the fiber bundle for about 16 hours. During this time about 0.38 cubic centimeter of water permeates the fiber walls and is recovered through the outlet valve at the bottom of the U-tube, indicating the fibers are excellently well suited for use in permeability separatory apparatus and processes. The permeation coefficient for this test is calculated as follows:

Fiber dimensions:

| | |
|---|---|
| L=30 cm. | $D_M$ (mean dia.)=149$\mu$ |
| $D_o$=190$\mu$ | $t$ (wall thickness)=41$\mu$ |
| DI=108$\mu$ | N=No. of fibers=50 |

Transfer area
= $\pi \times D \times L \times N$
= 70 cm.²

Permeation rate
=0.38 gm./16 hrs.
=6.6×10⁻⁶ gm./sec.

Driving force=188 p.s.i.—1.32×10⁴ gm./cm.²

$$PC = \frac{\text{Permeation rate} \times \text{thickness}}{\text{Area} \times \text{Driving Force}}$$

$$= \frac{6.6 \times 10^{-6} \times 4.1 \times 10^{-3}}{70 \times 1.32 \times 10^4}$$

$$= 2.9 \times 10^{-14} \text{ cm./sec.}$$

EXAMPLE 2

A bundle of 104 hollow fibers prepared according to the foregoing procedure of Example 1, about 50 cm. long and each having an outside diameter of about 104$\mu$ and an inside diameter of about 69$\mu$ was leached in water at room temperature then air dried. The bundle was formed in the shape of a loop with all of the open ends together and the bundle was strung through a test cell made from copper tubing. The open ends of the fiber were first capped over with a cement to prevent plugging with epoxy and then that section of the bundle was potted in the copper tube with epoxy resin. After the resin was cured the end of the potting was cut off to expose the open ends of the fibers.

A reverse osmosis test was then conducted by pumping sea water (total solids=35,000 p.p.m.) through the copper tubing over the outside of the hollow fibers at 600 p.s.i.g. Water containing 189 p.p.m. total solids permeated the fiber walls and flowed from the open fiber ends at a rate of 0.20 gm./hr.

Calculations of PC

Fiber dimensions:

| | |
|---|---|
| $D_o$=104 $\mu$ | $D_M$=86.5 $\mu$ |
| $D_I$=69 $\mu$ | $t$=17.5 $\mu$ |
| L=50 cm. | No. of fibers=104 |

Transfer area=141 cm.²
Permeation rate=5.56×10⁻⁵ gm./sec.
Driving force=600-342 (osmotic pressure)
= 258 p.s.i.=1.81×10⁴ gm./cm.²

$$PC = \frac{5.56 \times 10^{-5} \times 1.75 \times 10^{-3}}{141 \times 1.81 \times 10^4}$$

$$= 3.8 \times 10^{-14} \text{ cm./sec.}$$

EXAMPLE 3

A bundle of 200 hollow fibers spun according to the procedure in Example 1, about 48 cm. long and each having an outside diameter of 63 microns and in inside diameter of 32 microns was assembled in a copper tube test cell as in Example 2, except that the sulfolane in the fibers was not leached from the fibers and the fibers were not dried before potting. In this case the bundle was potted before leaching. The sulfolane was leached with water at 25° C. after the epoxy resin had cured and the bundle was kept wet thereafter.

A reverse osmosis test was conducted under the same conditions as Example 2. Water containing 132 p.p.m. dissolved solids permeated the fiber walls and was collected from the open fiber ends at the rate of 0.42 g./hr.

Calculations of PC

| | |
|---|---|
| $D_o$=63 | $D_M$=42.5 |
| $D_I$=32 | $t$=15.5 |
| L=48 | No. of fibers=200 |

Transfer area=128 cm.²
Permeation rate=1.16×10⁻⁴ gm./sec.
Driving force=1.81×10⁴ gm./cm.²

$$PC = \frac{1.16 \times 10^{-4} \times 1.55 \times 10^{-3}}{128 \times 1.81 \times 10^4}$$

$$= 7.8 \times 10^{-14} \text{ cm./sec.}$$

EXAMPLE 4

A cell was prepared which was identical to the cell in Example 3 in all respects except that the cell was leached in water at 80° C. after potting. In the reverse osmosis test with sea water the water recovery rate was 0.46 gm./hr. and the total dissolved solids content was 43 p.p.m.

$$PC = 8.5 \times 10^{-14} \text{ cm./sec.}$$

Single fiber permeation tests were made with hollow fibers melt spun from blends containing varying amounts of sulfolane following the test procedure discussed hereinbefore in connection with Formula I. The observed relationship of permeability coefficient to sulfolane content, based on cellulose triacetate weight, is listed below.

| Permeability coefficient, cm./sec. | Sulfolane content, wt. percent |
|---|---|
| 2.3×10⁻¹³ | 28.6 |
| 3.3×10⁻¹³ | 31.0 |
| 4.3×10⁻¹³ | 33.3 |
| 5.1×10⁻¹³ | 35.5 |
| 5.3×10⁻¹³ | 37.5 |

EXAMPLE 6

The general procedure of Example 3 is repeated, excepting the cellulose triacetate is mixed with different plasticizers and an aqueous 3.5% NaCl solution is treated. The results are as set forth in the following table.

| Plasticizer | Parts plast. 100 pts. poly. | P.C., cm./sec. | Salt rejection, percent at 700 p.s.i. (3.5% NaCl) |
|---|---|---|---|
| Sulfolanyl acetate | 60 | 1.8×10⁻¹³ | |
| Sulfolanyl propionate | 60 | 1.4×10⁻¹³ | |
| Sulfolanyl butyrate | 60 | 8.0×10⁻¹⁴ | 100 |
| Methyl sulfolanyl ether | 60 | 3.1×10⁻¹³ | 97 |
| Ethyl sulfolanyl ether | 60 | 5.8×10⁻¹³ | 100 |
| Propyl sulfolanyl ether | 60 | 1.9×10⁻¹³ | 98 |
| o-Tert[1] butyl phenol not H₂O soluble | 60 | 6.0×10⁻¹⁵ | |
| 3-methyl sulfolane | 60 | 7.9×10⁻¹⁴ | |
| 2,4-dimethyl sulfolane | 60 | 1.4×10⁻¹³ | |
| Dimethyl[1] phthalate not H₂O soluble | 60 | 4.0×10⁻¹⁵ | |
| Sulfolane | 60 | 3.7×10⁻¹³ | 98 |
| Dimethoxy ethyl[1] phthalate not H₂O soluble | 60 | 4.6×10⁻¹⁵ | 92 |

[1] Water-insoluble plasticizers.

NOTE.—All fibers leached in water at room temperature and kept wet until tested.

EXAMPLE 7

The general procedure of Example 3 is repeated, excepting to use a polymer of cellulose diacetate (37.1 to 43.2% acetyl) and various plasticizers therefore. The results are as set forth in the following table.

| Plasticizer | Parts plast./ 100 parts poly. | Spinning temp.,° C. | P.C., cm./sec. | Salt rejection, percent at 700 p.s.i. (3.5% NaCl) |
|---|---|---|---|---|
| Sulfolane | 60 | 230 | 5.7×10⁻¹³ | 84-90 |
| Sulfolanyl acetate | 60 | 235 | 2.9×10⁻¹³ | |
| Sulfolanyl propionate | 60 | 230 | 1.9×10⁻¹³ | |
| Sulfolanyl butyrate | 60 | 230 | 1.0×10⁻¹³ | |
| Methyl-sulfolanyl ether | 60 | 230 | 4.0×10⁻¹³ | 87 |
| Ethyl sulfolanyl ether | 60 | 235 | 7.4×10⁻¹³ | 90 |
| Propyl sulfolanyl ether | 60 | 233 | 3.2×10⁻¹³ | 88 |
| o-Tert butyl phenol [1] | 60 | 225 | 6.0×10⁻¹³ | |
| 3-methyl sulfolane | 60 | 235 | 4.2×10⁻¹³ | 90 |
| 2,4-dimethyl sulfolane | 60 | 235 | 4.0×10⁻¹³ | 92 |
| Di methyl phthalate [1] | 60 | 230 | 6.0×10⁻¹³ | |

[1] Water-insoluble plasticizers.

NOTE.—All fibers leached in water at room temperature and kept wet until tested.

EXAMPLE 8

The general procedure of Example 3 is repeated, excepting to employ an ethyl cellulose polymer plasticized with sulfolane. The results are as set forth in the following table.

| Weight ratio sulfolane to ethylcellulose | Leaching temp. | P.C., cm/sec | S.R. (percent) | Polymer |
|---|---|---|---|---|
| 0.6 to 1 | 25 | $0.1 \times 10^{-13}$ | 81 | Ethylcellulose, 48.8% ethoxyl. |
|  | 50 | $1.3 \times 10^{-13}$ | 97 |  |
|  | 80 | $3.3 \times 10^{-13}$ | 22 |  |
| 0.6 to 1 | 25 | $3.9 \times 10^{-13}$ | 83 | Ethylcellulose, 46.1% ethoxyl. |
|  | 50 | $1.7 \times 10^{-13}$ | 81 |  |
|  | 80 | $9.3 \times 10^{-13}$ | 14 |  |

EXAMPLE 9

The general procedure of Example 3 is repeated, excepting to employ Nylon/6 as the polymer plasticized with about 50 weight percent m-cresol, based on Nylon 6 weight. The resulting leached fibers have a PC of about $1.4 \times 10^{-13}$ cm./sec. and a salt rejection of about 90%.

Commensurate excellent results to the foregoing are obtained when other of the herein indicated polymers and plasticizers are utilized in the preparation of permeable hollow fiber membranes and when utilized for the various uses discussed herein.

What is claimed is:

1. The method of making a separatory cell of hollow fiber permeability membranes comprising extruding a plurality of hollow fibers from a molten intimate mixture of a thermoplastic polymer and a plasticizer for said polymer, said plasticizer having a boiling point above the temperature at which said molten mixture is extruded, and said plasticizer further characterized in being soluble in a non-solvent for said polymer; fabricating said extruded hollow fibers into a separatory cell; and, subsequently leaching said plurality of hollow fibers with said non-solvent in which said plasticizer is soluble.

2. The method of claim 1, wherein said thermoplastic polymer is a polyamide.

3. The method of claim 1, wherein said thermoplastic polymer is a cellulose ether.

4. The method of claim 1, wherein said thermoplastic polymer is a cellulose ester.

5. The method of claim 4, wherein said cellulose ester is a cellulose acetate.

6. The method of claim 5, wherein said cellulose acetate is cellulose triacetate.

7. The method of claim 5, wherein said cellulose acetate is cellulose diacetate.

8. The method of claim 1, wherein said plasticizer is a water-soluble plasticizer.

9. The method of making a hollow fiber permeability membrane having a water permeability coefficient of not less than about $5 \times 10^{-14}$ cm./sec. and a salt rejection value of not less than about 75% comprising extruding into the shape of a hollow fiber a molten intimate mixture of a polymer selected from the group consisting of polyamides, cellulose ethers and cellulose esters and a plasticizer for said polymer, said plasticizer selected from the group consisting of sulfolane and ring substituted derivatives thereof, N-ethyl-o and p-toluene sulfonamide and polyglycols; and subsequently, leaching said hollow fiber with a non-solvent for said polymer which is a solvent for said plasticizer.

10. The method of making a hollow fiber permeability membrane having a water permeability coefficient of not less than about $5 \times 10^{-14}$ cm./sec. and a salt rejection value of not less than about 75% comprising extruding into the shape of a hollow fiber a molten intimate mixture of a cellulose ester and from about 25 to 125 weight percent, based on cellulose ester weight, of a plasticizer for said cellulose ester selected from the class consisting of sulfolane and water-soluble ring-substituted derivatives thereof; and, subsequently, leaching said hollow fiber with an aqueous solution that is a non-solvent for said cellulose ester and a solvent for said plasticizer.

11. The method of claim 10, wherein said intimate mixture contains between about 25 and 75 weight percent, based on cellulose ester weight, of said plasticizer.

12. The method of claim 10, wherein said cellulose ester is cellulose triacetate and said plasticizer is a compound represented by the structural formula:

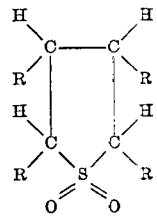

wherein R is selected from the class consisting of hydrogen and methyl radicals.

13. A melt spun permeable hollow fiber of a thermoplastic polymer characterized in having a water permeability coefficient of not less than about $5 \times 10^{-14}$ cm./sec. and a salt rejection value of not less than about 75%, and further characterized in retaining at least these minimum values over an extended period of time when subjected to an aqueous dilute inorganic saline solution.

14. The hollow fiber of claim 13, wherein said thermoplastic polymer is a cellulose ether.

15. The hollow fiber of claim 13, wherein said thermoplastic polymer is a cellulose ether.

16. The hollow fiber of claim 13, wherein said thermoplastic polymer is a cellulose ester.

17. The hollow fiber of claim 16, wherein said cellulose ester is cellulose triacetate.

18. The hollow fiber of claim 13, wherein said thermoplastic polymer is a polyamide.

References Cited

UNITED STATES PATENTS

| | | | |
|---|---|---|---|
| 2,214,442 | 9/1940 | Spanagel | 264—209 X |
| 2,435,071 | 1/1948 | Evans et al. | 260—30.2 X |
| 2,461,339 | 2/1949 | Morris et al. | 260—30.2 X |
| 2,707,201 | 4/1955 | Fernald et al. | 264—211 X |
| 2,915,483 | 12/1959 | Barnhart | 260—2.5 |
| 3,075,242 | 1/1963 | Grafried. | |
| 3,228,876 | 1/1966 | Mahon | 210—321 X |
| 3,228,877 | 1/1966 | Mahon | 210—321 X |

ROBERT F. WHITE, *Primary Examiner.*

T. CARVIS, *Assistant Examiner.*

U.S. Cl. X.R.

161—178; 210—321, 500; 260—2.5; 264—177, 209, 277